United States Patent
Komatsu et al.

(10) Patent No.: US 6,807,026 B2
(45) Date of Patent: Oct. 19, 2004

(54) DISK DRIVE HAVING A STRUCTURE FOR PREVENTING A FRONT SHUTTER FROM COMING OFF FROM A MAIN FRAME

(75) Inventors: Hisateru Komatsu, Tendo (JP); Makoto Takahashi, Obanazawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 118 days.

(21) Appl. No.: 10/231,227

(22) Filed: Aug. 29, 2002

(65) Prior Publication Data

US 2003/0043500 A1 Mar. 6, 2003

(30) Foreign Application Priority Data

Aug. 30, 2001 (JP) .......................... 2001-261939

(51) Int. Cl.$^7$ .......................... G11B 17/02; G11B 33/02
(52) U.S. Cl. .................................... 360/99.02
(58) Field of Search .......................... 360/97.01, 99.01, 360/99.02, 99.03, 99.06, 99.07, 133

(56) References Cited

U.S. PATENT DOCUMENTS

| | | | | |
|---|---|---|---|---|
| 5,303,104 A | * | 4/1994 | Aruga et al. | 360/267.2 |
| 5,648,882 A | * | 7/1997 | Tangi et al. | 360/99.06 |
| 5,748,595 A | * | 5/1998 | Nakajima | 369/77.2 |
| 5,924,782 A | * | 7/1999 | Park | 312/328 |
| 5,940,245 A | * | 8/1999 | Sasaki et al. | 360/99.06 |
| 5,956,205 A | * | 9/1999 | Konno et al. | 360/99.02 |
| 6,229,440 B1 | * | 5/2001 | Fairchild | 340/545.6 |
| 6,239,944 B1 | * | 5/2001 | Sato et al. | 360/97.02 |
| 2002/0035646 A1 | * | 3/2002 | Nicklos | 709/310 |
| 2002/0167755 A1 | * | 11/2002 | Staley et al. | 360/99.06 |
| 2003/0053248 A1 | * | 3/2003 | Komatsu et al. | 360/99.06 |

FOREIGN PATENT DOCUMENTS

| | | | |
|---|---|---|---|
| JP | 63-317999 | * | 12/1988 |
| JP | 2000-331469 | * | 11/2000 |

* cited by examiner

*Primary Examiner*—Jefferson Evans
(74) *Attorney, Agent, or Firm*—Frishauf, Holtz, Goodman & Chick, P.C.

(57) ABSTRACT

A projecting portion is formed on an edge, which provides a notch for an eject button, of a front shutter of an FDD. The projecting portion projects toward the eject button. The eject button provides a cavity for canceling interference between the projecting portion and the eject button in a state without external force. Upon receiving external force, the eject button is pressed to the projecting portion. In this state, the front shutter is forced to rotate in a closing direction thereof. Because the front shutter keeps a closed state, the force given to the projecting portion has a direction parallel to a main surface of a door member of the front shutter. Therefore, the door member is not bent by the external force and the front shutter does not come off from a main frame of the FDD.

4 Claims, 5 Drawing Sheets

DISK DRIVE HAVING A STRUCTURE FOR PREVENTING A FRONT SHUTTER FROM COMING OFF FROM A MAIN FRAME

BACKGROUND OF THE INVENTION

This invention relates to a flexible disk drive, in particular, to a front shutter coming off preventing structure for preventing a front shutter rotatably attached to a loading slot of the flexible disk drive from coming off from the flexible disk drive.

As well known, a flexible disk drive (hereinafter simply called FDD) is an apparatus for carrying out data recording and reproducing operations to and from a disk-shaped magnetic recording medium of a flexible disk (hereinafter simply called FD) loaded thereinto. The FDD is widely used for an external memory apparatus of an electronic information apparatus such as a personal computer.

Generally, the FDD of this type provides a front shutter for a loading slot into which the FD is inserted. The front shutter is located at the inside of the loading slot and always pressed by a torsion spring against the loading slot. The front shutter is opened inside against pressing force of the torsion spring by insertion of the FD.

The FDD further comprises an eject button. Because the eject button projects frontward from the FDD, it is easy to receive external force. If a front panel is provided to the FDD, the eject button is possible to withstand the external force by support of the front panel. However, an existing thin type FDD has no front panel and uses a part of a case of personal computer as the front panel. Thus, when the eject button receives external downward force, it directly touches and rotates the front shutter. If larger external force is given to the eject button, the front shutter is bent by the eject button and comes off from a frame of the FDD in a worst case.

As mentioned above, the existing FDD has a fear that the front shutter is detached from the frame by the external force given to the eject button.

SUMMARY OF THE INVENTION

It is therefore an object of this invention to provide a front shutter coming off preventing structure capable of preventing a front shutter from coming off from a frame of an FDD without relatively large-scale structure modification and an increase of parts.

Other object of this invention will become clear as the description proceeds.

According to an aspect of this invention, a front shutter coming off preventing structure is for preventing a front shutter from coming off from a main frame of an FDD. The front shutter rotatably is attached to the main frame and has an edge providing a notch for an eject button. The front shutter coming off preventing structure comprises a projecting portion formed on the edge and projecting toward the eject button. The projecting portion forces the front shutter to rotate in a closing direction thereof when the eject button is pressed to the projecting portion by external force.

DESCRIPTION OF THE PREFERRED EMBODIMENT

Figure 1:
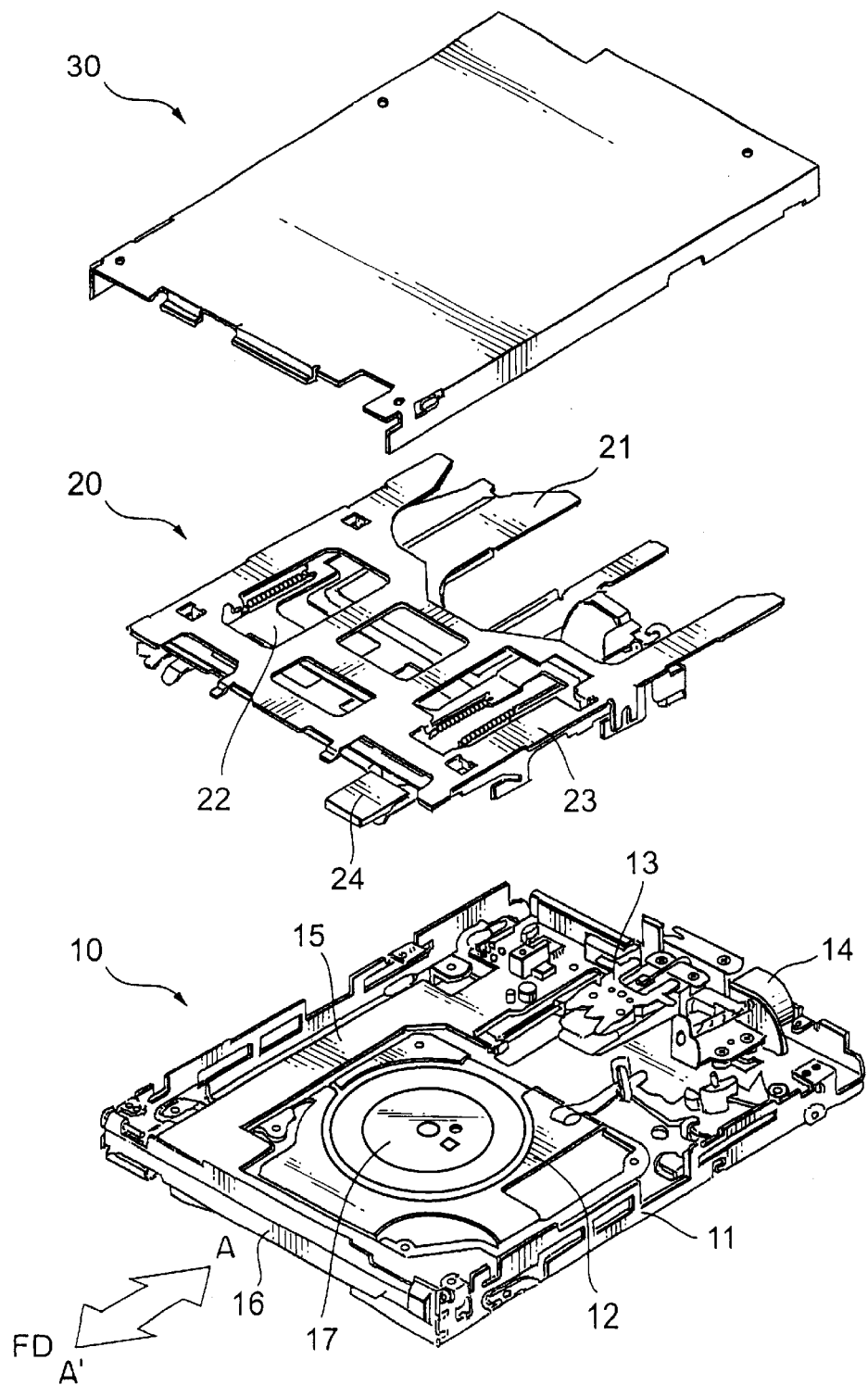
FIG. 1 is an exploded perspective view of an existing FDD.

Referring to FIG. 1, description will be at first directed to an existing thin-model FDD for a better understanding of this invention.

As shown in FIG. 1, the FDD comprises a main assembly 10, an FD loading/ejecting mechanism portion 20 and a cover 30. The FDD further comprises a front panel (not shown) with an FD loading slot for loading/ejecting an FD. The FD is inserted and ejected in/from the FDD through the FD loading slot in directions along a bi-directional arrow A–A'.

The main assembly 10 comprises a main frame 11, a motor frame 12, a carriage assembly 13, a stepping motor 14, a main circuit board 15 and a front shutter 16 which are mounted on the main frame 11.

On the motor frame 12, a sub circuit board (not shown) is mounted. On the sub circuit board, a spindle motor (not shown) with a rotating axis to which a turn table 17 is fixed and a circuit for controlling an operation of the spindle motor are mounted.

The carriage 13 has a pair of magnetic heads for writing/reading information to/from magnetic recording medium of an FD.

The stepping motor 14 has a rotating axis with an outer peripheral surface in which a thread groove is cut to move the carriage assembly 13 in an extending direction along the rotating axis.

The FD loading/ejecting mechanism portion 20 comprises a disk holder 21, an ejecting plate 22 and a sub frame 23. The FD loading/ejecting mechanism portion 20 is attached to the main assembly 10 so that the disk holder 21 and ejecting plate 22 are located at the inside of the frame 11. The sub frame 23 is fixed to an upper side of the main frame 11.

The disk holder 21 is for holding the FD loaded into the FDD.

The ejecting plate 22 has an eject button 24 and holds the disk holder 21 to move upward and downward. When the FD is inserted into the FDD through the FD loading slot, the ejecting plate 22 guides the disk holder 21 downward to place the FD held by the disk holder 21 on the turn table 17. At this time, the ejecting plate 22 moves frontward (or for an ejecting direction, i.e. the direction of the arrow A') to further project the eject button 24 from the FDD. If the eject button 24 is pushed backward (or for an inserting direction, i.e. the direction of the arrow A), the ejecting plate 22 guides the disk holder 21 upward and partially projects the FD from the FD loading slot.

The sub frame 23 is fixed to the main frame 11 to support the ejecting plate 22 movably frontward and backward and to enable the ejecting plate 22 and the disk holder 21 to move as mentioned above.

The disk holder 21, the ejecting plate 22 and the sub frame 23 are individually made by blanking, pressing, and/or bending metal plates.

The cover 30 is fixed to the main frame 11 by screws (not shown) to cover the upper surface of the FDD.

Figure 2:
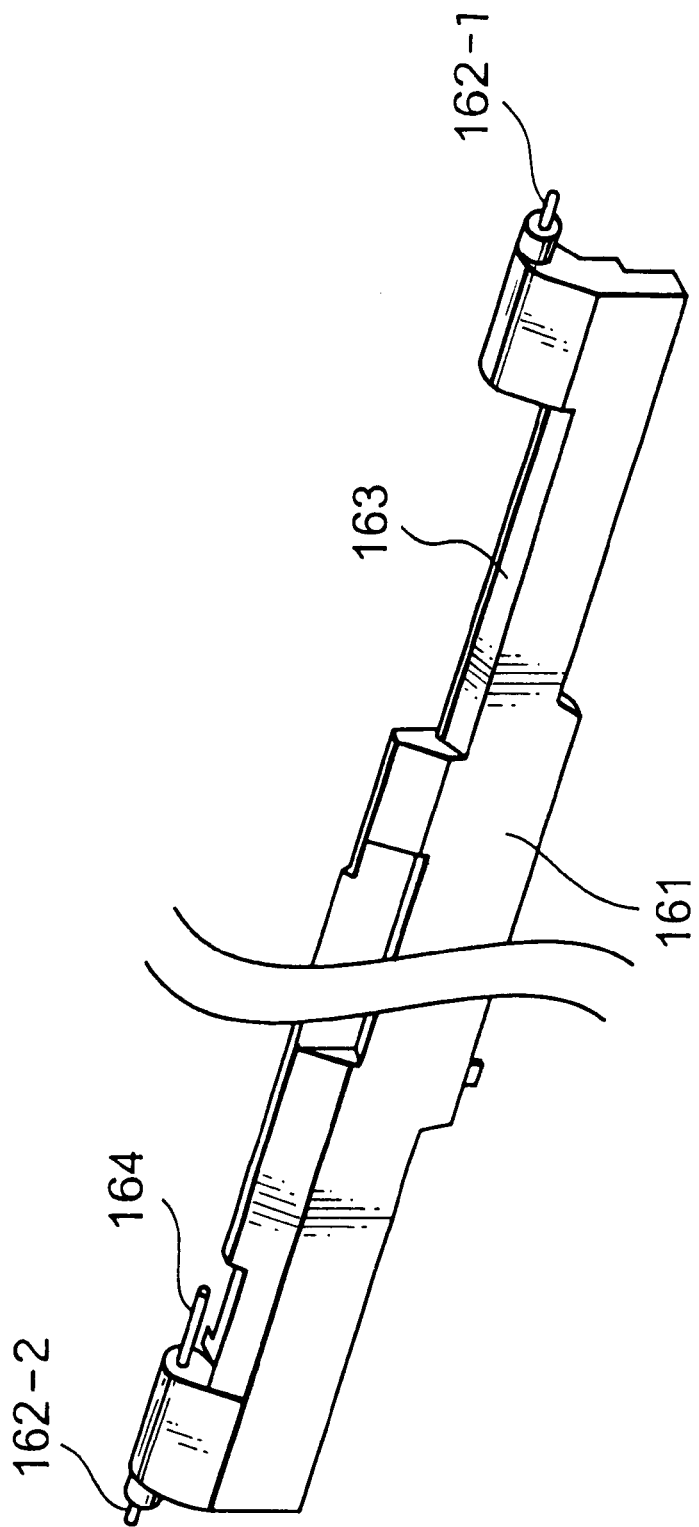
FIG. 2 is a perspective view of a front shutter used in the FDD of FIG. 1.

Next, referring to FIG. 2 together with FIG. 1, the description will be made about the front shutter 16.

The front shutter 16 is rotatably attached at a front of the main frame 11 as mentioned above. The front shutter 16 is made of, for example, synthetic resin and comprises a door member 161 and a pair of coaxial pivots 162-1 and 162-2. The door member 161 is for closing the FD loading slot of the front panel. The coaxial pivots 162-1 and 162-2 are formed at an upper part of the door member 161 to project from the both side ends of the upper part in the opposing directions. In addition, a rectangular notch 163 for the eject button 24 is formed in the door member 161 while a pin 164 for a torsion spring (not shown) is formed at the upper part of the door member 161.

The main frame 11 has side plates opposing to each other. In the side plates, holes are formed to receive the coaxial pivots 162-1 and 162-2. The tip parts of the coaxial pivots 162-1 and 162-2 are inserted in the holes of the side plates and thereby the front shutter 16 is rotatably attached to the main frame 11. Here, an interval between the side plates of the main frame 11 is smaller than a distance between the tips of the coaxial pivots 162-1 and 162-2. Thus, bending the door member 161 is necessary to attach the front shutter 16 to the main frame 11.

Referring to FIGS. 3 to 6, the description will proceed to a front shutter coming off preventing structure according to a preferred embodiment of this invention.

Figure 3:
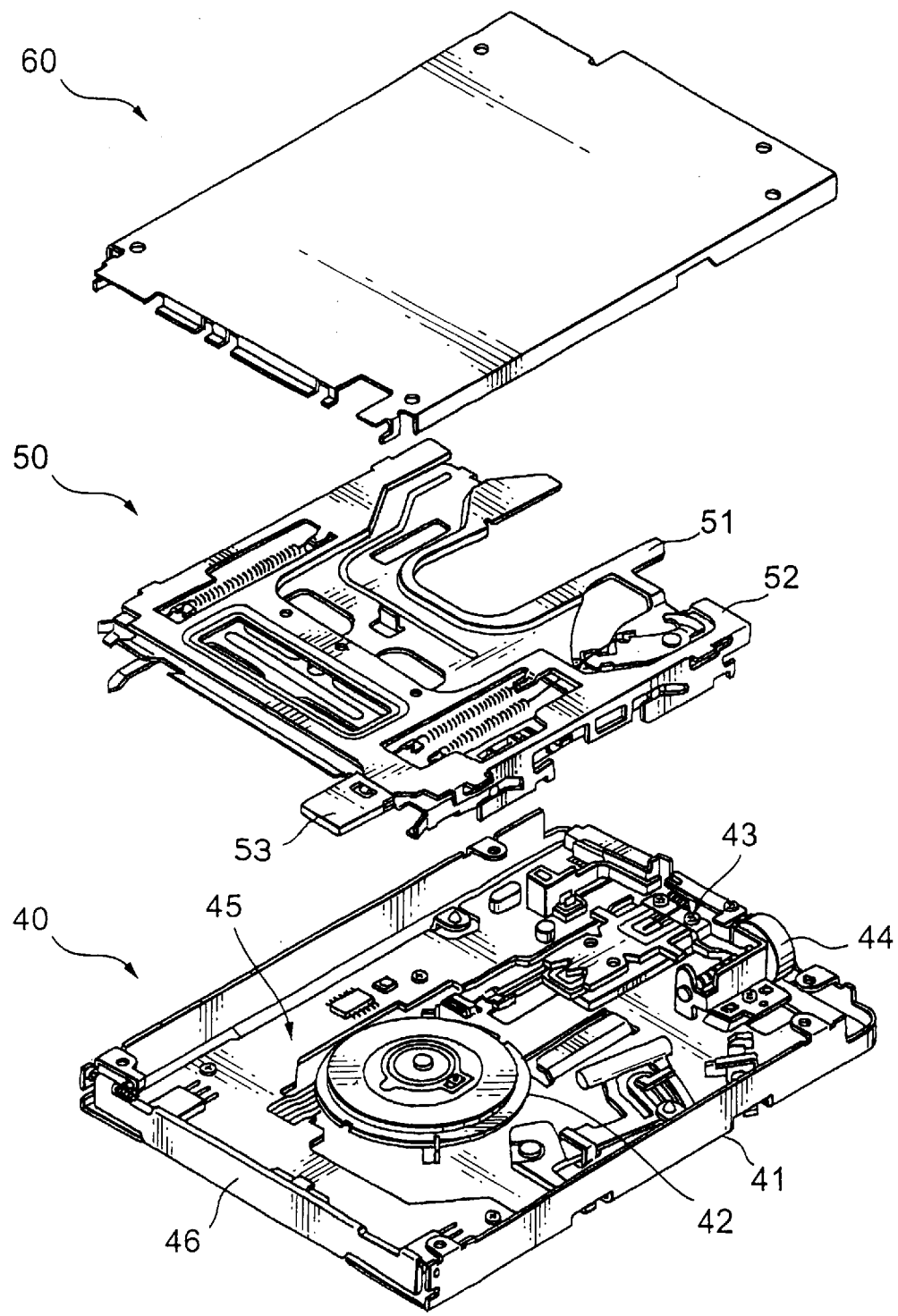
FIG. 3 is an exploded perspective view of an FDD adopting a front shutter coming off preventing structure according to a preferred embodiment of this invention.

FIG. 3 is an exploded perspective diagram of a FDD adopting the front shutter coming off preventing structure.

The FDD of FIG. 3 comprises a main assembly 40, an FD loading/rejecting mechanism portion 50 and a cover 60 like that of FIG. 1. The structure of the FDD is essentially similar to that of the existing FDD shown in FIG. 1, however, there are some of improvements. For instance, the main assembly 40 has no motor frame while the FD loading/rejecting mechanism portion has no sub frame. However, because these improvements are not related to this invention directly, the description about the improvements is omitted.

The main assembly 40 comprises a main frame 41, a spindle motor (not shown) to which a turntable 42 is fixed, a carriage assembly 43, a stepping motor 44, a main circuit board 45, a front shutter 46, and so on. The spindle motor, the carriage assembly 43, the stepping motor 44, the main circuit board 45, the front shutter 46 are attached to the main frame 41.

The FD loading/rejecting mechanism portion 50 comprises a disk holder 51 and an ejecting plate 52.

Figure 4:
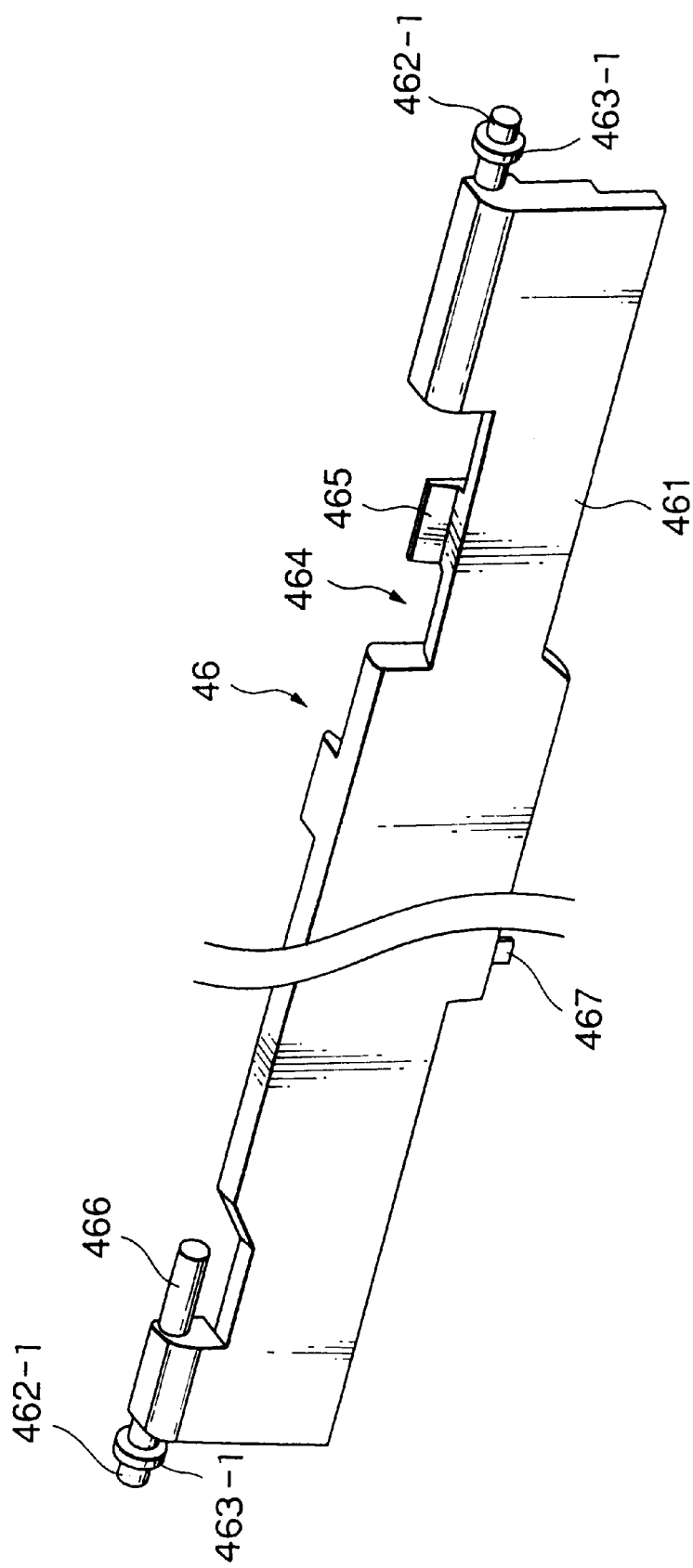
FIG. 4 is a perspective view of a front shutter used in the FDD of FIG. 3.

Next, referring to FIG. 4 together with FIG. 3, the description will be made about the front shutter 46.

The front shutter 46 is attached to the main frame 41 as mentioned above. For example, the front shutter 46 is made by integral molding using synthetic resin. The front shutter 46 comprises a door member 461 and a pair of coaxial pivots 462-1 and 462-2.

The door member 461 is for closing an opening (or an FD loading slot) of a front panel (not shown) attached (or placed) to a front end of the main frame 41.

The coaxial pivots 462-1 and 462-2 are formed at an upper part (or at an upper edge side) of the door member 461 to project from the both side ends of the upper part of the door member 461 in the opposing directions. The coaxial pivots 462-1 and 462-2 have flanges 463-1 and 463-2 formed at little distances from the their tips. In this embodiment, each of the flanges 463-1 and 463-2 is formed at the approximately middle of each of the coaxial pivots 462-1 and 462-2.

In addition, at the upper end side of the door member 461, a rectangular notch 464 is made to correspond to the eject button 53. On the upper edge of the rectangular notch 464, a projecting portion 465 projecting upward (i.e. toward the eject button 53) is formed at the rear side of the door member 461.

The front shutter 46 further comprises a pin 466 for supporting a torsion spring (not shown) and a stopper 467 projecting downward from the lower edge of the door member 461.

The main frame 41 has side plates opposing to each other. In the side plates, holes are formed to receive the coaxial pivots 462-1 and 462-2. The tip parts of the coaxial pivots 462-1 and 462-2 are inserted in the holes of the side plates to attach the front shutter 46 to the main frame 41. In this event, because the flanges 463-1 and 463-2 are larger than the holes, they do not enter the holes. Accordingly, the flanges 463-1 and 463-2 restrict movement of the front shutter 46 along the extending direction (or right-hand and left-hand directions) of the coaxial pivots 462-1 and 462-2. Thus, the front shutter 46 is attached to the main frame 41 in a condition to rotate. Here, an interval between the side plates of the main frame 41 is smaller than a distance between the tips of the coaxial pivots 462-1 and 462-2. Accordingly, bending the door member 461 is necessary to attach the front shutter 46 to the main frame 41. Additionally, the distance between the flanges 463-1 and 463-2 is smaller than the interval between the side plates of the main frame 41 not to restrict the rotation of the front shutter 46.

The front shutter 46 is forced to rotate in a closing direction by the torsion spring attached to the pin 466 in the state that it is attached to the main frame 41. The stopper 467 runs into an engaging portion (not shown) formed at the front end of the main frame 41 and stops the rotation of the front shutter 46. That is, the stopper 467 keeps the FD loading slot of the FDD closed.

Figure 5:
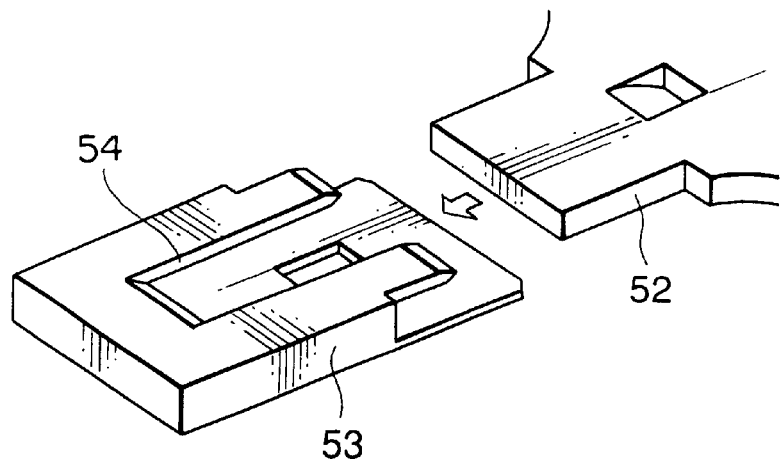
FIG. 5 is a perspective view seen from a lower side of an eject button used in the FDD of FIG. 3.

On the other hand, the eject button 53 is made of synthetic resin and formed in a shape as illustrated in FIG. 5. That is, the eject button 53 provides a space for receiving a part of the eject plate 52 and has a cut-off portion 54 to form a cavity together with the part of the eject plate 52 inserted into the space.

Figure 6:
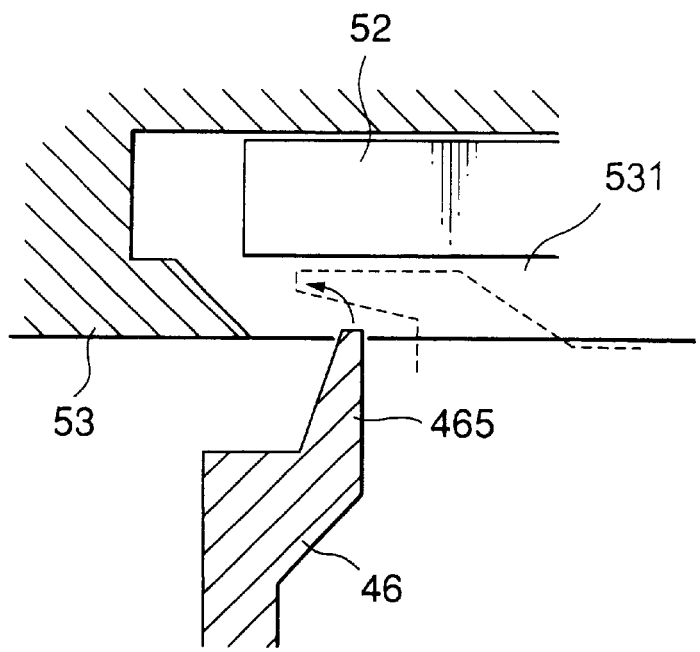
FIG. 6 is a sectional view for describing physical relationship between a projecting portion of a front shutter and a cavity of a eject button in the FDD of FIG. 4.

FIG. 6 shows physical relationship between the eject button 53 and the projecting portion 465 of the front shutter 46. The projecting portion 465 (or the door member 461) is in a vertical state when the front shutter 46 does not receive external force (except for the force from the torsion spring). This is because, the front shutter 46 is forced by the torsion spring and the stopper 467 engages with the engaging portion of the main frame 41. When the projecting portion 465 is in the up direction, its tip is barely in the cavity 531 of the eject button 53.

Upon inserting the FD into the FDD, the front shutter 46 rotates in an opening direction about the coaxial pivots 462-1 and 462-2. In FIG. 6. the front shutter 46 rotates counterclockwise and the projecting portion 465 is received in the cavity 531 of the eject button 53 as shown by a broken line. Thus, the front shutter 46 is possible to rotate regardless of the projecting portion 465 because the cavity 531 is formed in the eject button 53. That is, the cavity 531 is formed to cancel interference between the eject button 53 and the projecting portion 465 in a state without abnormal external force.

Next, the description will be made about a case where the eject button 53 receives the abnormal external force.

In FIG. 6, if the eject button 53 receives downward external force, the eject plate 52 is bent or deformed and thereby the eject button 53 (or the part of the eject plate 52 received in the space of the eject button 53) runs into the projecting portion 465. That is, the eject button 53 is pressed to the projecting portion 465 by the external force. Here, the projecting portion 465 is formed to place at a right hand side of FIG. 6 against the rotating axis (or the coaxial pivots 462-1 and 462-2) of the front shutter 46. Accordingly, the front shutter 46 is forced to rotate clockwise by the eject plate 52 receiving the downward external force. However, the front shutter 46 is impossible to rotate clockwise because the stopper 467 engages the engaging portion of the main frame 41 as mentioned above. Thus, the front shutter 46 keeps in a closed state.

Even if the downward external force is stronger, the door member 461 is not bent by the force. This is because the direction of the force is parallel to a main surface of the door member 461. Therefore, the front shutter 46 does not come off from the main frame 41 when the eject button 53 receives the downward external force.

According to this embodiment, the front shutter coming off preventing structure can prevent the front shutter from coming off from the main frame when the eject button receives the external force.

The front shutter coming off preventing structure of this embodiment is inexpensive because slight modification is made for the shapes of the door member and the eject button and the number of parts is the same as that of the existing FDD.

While this invention has thus far been described in conjunction with the preferred embodiment thereof, it will readily be possible for those skilled in the art to put this invention into practice in various other manners. For example, there is no limitation about the shape and the location of the projecting portion 465 on condition that the projecting portion 465 rotates the front shutter in the closing direction when it pressed by the eject button 53 and does not interfere with the rotation of the front shutter 46 in the state without abnormal external force. Furthermore, the eject button 53 has a concavity as the cavity 531 instead of the cut-off portion 54. In this case, when the downward external force is given to the eject button 53, the eject button 53 directly runs into the projecting portion 465 of the front shutter 46. In addition, the front shutter coming off preventing structure of this invention is applicable to the FDD of FIG. 1.

What is claimed is:

1. A front shutter coming off preventing structure for preventing a front shutter from coming off from a main frame of a flexible disk drive, wherein said front shutter is rotatably attached to said main frame and includes an edge having a notch for an eject button, said front shutter coming off preventing structure comprising:

a projecting portion formed on said edge in said notch and projecting toward said eject button for forcing said front shutter to rotate in a closing direction when said eject button is pressed toward said projecting portion.

2. The front shutter coming off preventing structure as claimed in claim 1, wherein said eject button comprises a cavity for preventing interference between said eject button and said projecting portion to allow said front shutter to rotate without interference when said elect button is not pressed toward said projecting portion.

3. The front shutter coming off preventing structure as claimed in claim 2, wherein said cavity receives said projecting portion when said front shutter rotates in an opening direction.

4. A flexible disk drive having a structure for preventing a front shutter from coming off from a main frame of the flexible disk drive, wherein said front shutter is rotatably attached to said main frame and includes an edge having a notch for an eject button, said front shutter coming off preventing structure comprising:

a projecting portion formed on said edge in said notch and projecting toward said eject button for forcing said front shutter to rotate in a closing direction when said eject button is pressed toward said projecting portion.

* * * * *